No. 652,524. Patented June 26, 1900.
R. SHEDENHELM.
REPLANTING ATTACHMENT FOR CULTIVATORS.
(Application filed July 1, 1899.)
(No Model.)
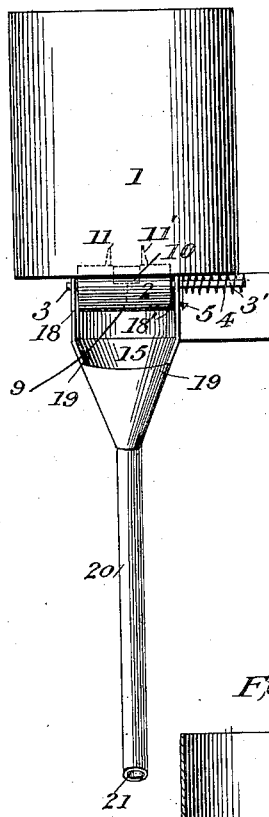
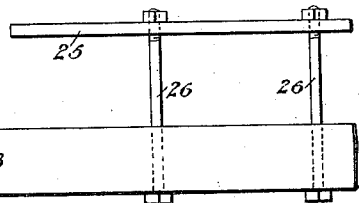
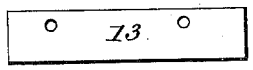
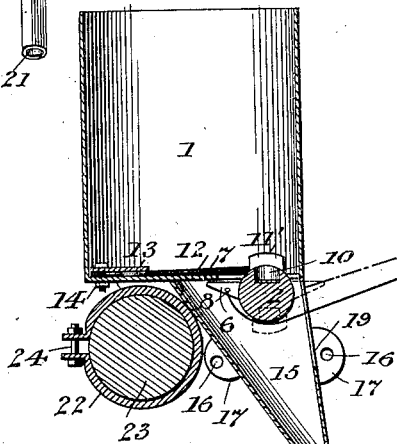
Witnesses:
E. C. Gorry
C. H. Robinson
Inventor:
Robert Shedenhelm

UNITED STATES PATENT OFFICE.

ROBERT SHEDENHELM, OF LADORA, IOWA.

REPLANTING ATTACHMENT FOR CULTIVATORS.

SPECIFICATION forming part of Letters Patent No. 652,524, dated June 26, 1900.

Application filed July 1, 1899. Serial No. 722,503. (No model.)

*To all whom it may concern:*

Be it known that I, ROBERT SHEDENHELM, a citizen of the United States, residing at Ladora, Iowa county, State of Iowa, have invented a new and useful Replanting Attachment for Cultivators, of which the following is a specification.

This invention relates to replanting attachments for cultivators to replant missing hills of corn while the corn is being cultivated the first time in a comparatively-cheap and in a more effective and convenient way.

With my invention I seek to make a replanting attachment which will attach to any cultivator at any place where it will be the easiest and most convenient to the operator and will not impede the action of the cultivator.

Figure 1 is a rear view. Fig. 2 is a transverse sectional view through the hopper and feeding devices, and Figs. 3, 4, and 5 are detail views.

Like numbers in the different views refer to the same parts.

1 is a hopper for carrying the corn. This hopper may have a suitable lid and be constructed in any convenient way. My invention has to do only with the bottom thereof.

2 is a feed-cylinder having projecting parts and a hole therein, all to be explained hereinafter.

3 and 3' are two of the above-referred-to projections and form axis for the cylinder. On 3' a coiled spring 4 is secured. One end of this spring is fastened to the outer end of 3', and the other end of the spring is fastened to some convenient place not connected with the cylinder, as 5. Spring 4 serves the purpose of holding the cylinder in position for filling and brings it back to this position when the cylinder is emptied, being aided by projection 6 of the cylinder. This projection serves as a stop to limit the backward motion of the cylinder and strikes the bottom of the hopper at 7. It must be noticed here that the bottom of the hopper fits around the cylinder neatly, except on the side toward 7, where it is about one-quarter of an inch distant. In arm 6 there is a hole 8, in which a strong cord 9 is tied for the purpose of operating the feed-cylinder.

10 is the hole in the feed-cylinder and is about five-eighths of an inch in diameter and about three-eighths deep. The depth can be regulated by leather wads 10', as shown in Fig. 5, placed snugly in the bottom of it to regulate its capacity. It serves the purpose of holding and dropping the right number of grains at the desired time and place.

11 and 11' are the two remaining projections of the cylinder and are placed one on either side of hole 10, serving the purpose of stirring the corn and for this purpose may be a little diagonally with the circumference of the cylinder, if desired, in order to give the corn more of a stir.

12 is a brush which holds back all of the corn except the grains which are lodged in the hole 10 and is fastened between the bottom of the hopper and plate 13 by two bolts, as 14, and can be easily removed and replaced when worn out.

15 is a funnel-shaped conductor made of two pieces and bolted together by bolts through holes 16 in fangs 17. It is also fastened to the bottom of the hopper with bolts through any desired number of such fangs. On the inner side of the funnel 15 are two flat places 18 and 18', in which are journaled the ends of the cylinder. At the back the funnel 15 is left open down as far as 19 to admit free access to the cylinder for the purpose of fastening the cord 9, regulating the capacity of the seed-orifice 10. On the lower end of funnel 15 is secured a piece of hose 20, which may be any desired length, so that its lower end 21 extends near the ground and serves the purpose of guiding the corn to the desired place. On the front side of funnel 15 is secured a clamp 22, which fits on the end of the cross-bar 23. 23 is rounded at this end, so that space is had where the end 21 of hose 20 and the foregoing mechanism can be swung any degree backward or forward, as desired. 22 is fastened on the cross-bar 23 by means of a bolt 24. The cross-bar 23 is fastened to a second bar by two bolts 26 of the proper length to form clamps for fastening this machine to the arch or beam of a cultivator. These two pieces 23 and 25 being wood, holes can be bored and bolts can be had the proper length, so that my attachment can be conveniently attached to any cultivator.

In using my device it is first bolted on the cultivator at the most convenient place to suit the operator by the means just described, so that the funnel 21 comes over the corn-row and at a place where the cultivator will be most likely to cover the grains which are dropped. If the device is fastened on the beam, 23 may be put above or below the beam 25, as desired, and on the right beam only would the attachment need to be fastened. Then the other mechanism is swung on 23, so that the end of the funnel 21 comes to a place to suit the operator. The outer end of cord 9 is held by the person to operate, or if there is a handy place where this end of the cord can be fastened in order to keep the cord always stretched then this way is preferred, because a little pull on the cord will operate the cylinder to drop the corn. On a cultivator where the plowman walks the cord may be stretched and tied to a double-ended tack, (not shown,) which is driven into the end of the handle where the plowman holds, being fastened as at 28. The operation of the replanter can be made by reaching the cord with the forefinger and lifting upon it.

From the foregoing it will be seen that when corn is put in the hopper and cord 9 is pulled it will bring the cylinder upside down and the ports of the cylinder to their corresponding dotted lines in Fig. 2 and that the grains of corn which lodge in hole 10 are brought through port-brush 12 and then thrown by centrifugal force and force of gravity from the hole into the passage formed by the funnel 15 and 20. This passage is in the direction of the throw of the cylinder—that is, the passage is in the direction where the cylinder will throw the corn as it leaves the hole, and being so the corn will go to the ground quicker than it would naturally drop. A quick or slow drop may be had, all depending on the pull given the cord, and for this reason the bulk of the attachment can be placed above the beams where it will be out of the way of the action of the cultivator and nothing but a piece of flexible hose be down near the shovels.

I claim my device to be simple and easily constructed.

What I claim as new, and desire Letters Patent on, is—

In a replanting attachment for cultivators, the seed-hopper 1, attached to the cross-bar 23, by clamps 22, having journaled therein the oscillating cylinder 2, provided with the orifice 10, interchangeable wads, for graduating the size of the orifice, agitating-pins 11, and 11' on either side thereof, operating-cord 9, returning-spring 4, and stop 6 and the funnel 15 and hose 20 all substantially as shown and described.

ROBERT SHEDENHELM.

Witnesses:
W. T. SHEDENHELM,
J. B. SHAUL.